Nov. 22, 1960 T. P. DIXON 2,961,483

PRINTING TIMER

Filed April 13, 1955 2 Sheets-Sheet 1

THOMAS P. DIXON
INVENTOR.

BY Lyon & Lyon
ATTORNEYS

Nov. 22, 1960 T. P. DIXON 2,961,483

PRINTING TIMER

Filed April 13, 1955 2 Sheets-Sheet 2

THOMAS P. DIXON
INVENTOR.

BY Lyon & Lyon
ATTORNEYS 2,961,483

PRINTING TIMER

Thomas P. Dixon, Los Angeles, Calif., assignor to Technicolor Corporation, Hollywood, Calif., a corporation of Maine Filed Apr. 13, 1955, Ser. No. 501,162

7 Claims. (Cl. 178—5.2)

This invention relates to apparatus for reproducing images on one medium which are recorded on another. More particularly, the invention relates to an improvement in apparatus which employs electronic control and monitoring devices for determining printing parameters when it is desired to reproduce an image on a recording medium and such medium differs in its characteristics from the medium from which the image is obtained.

In an application for Printing Timer, filed June 16, 1954, Serial Number 437,258, by William E. Evans et al., now Patent No. 2,863,938, there has been described and claimed a printing timer. This application is for an improvement in the original printing timer. In the original printing timer, signals representative of the optical transmission of discrete areas of different color image-aspect negatives, for example, are generated and are applied to separate channels. Each channel contains apparatus for converting these signals to density-representative signals. The average level of the density-representative signal is then established by a controllable peak-clipping circuit. The peak-clipping circuit output is applied to a linear contrast-control amplifier whose gain is controllable. The output of the linear amplifier is applied to a photocurve amplifier which modifies the signals applied to it in accordance with a desired relationship between density and cathode-ray tube screen brightness and, also, to compensate for nonlinearities in the brightness transfer characteristics of a cathode-ray tube employed at the output. Each of these cathode-ray tubes has a screen phosphor, the color of which provides an additive color component corresponding to the color represented by the image aspect associated with the channel.

The images on the cathode-ray tube screens are superimposed to present a composite picture in color. The brightness range of reproduction of each color, and thereby the contrast of the composite picture, is controlled by varying the gain of the linear amplifier. The brightness of each color, and thereby the color balance of the picture, is controlled by clipping the reference signals in each channel at different levels with the peak-clipping circuit. Calibrated indicators are associated with each of these circuits so that, after varying these controls to establish a picture having a desired color balance and contrast, the calibrations may be read to provide information as to the proper contrast and printer-light illumination required to provide a positive photographic print having substantially the same contrast and color balance. To compensate for the effects of overlap in the color characteristics of the dyes used to make the positive print, means are provided interconnected between each channel to feed signals therebetween to simulate the effect of the dye overlap in the electronically presented positive picture.

The above-described printing timer functions quite well to provide the desired results. However, in the system there are two nonlinear amplifiers; the first is one which has a logarithmic transfer characteristic, and the second, or photocurve amplifier, has a transfer characteristic which both modifies the signals applied to it in accordance with the desired relationship between density and cathode-ray tube screen brightness and, also, compensates for nonlinearities in the brightness transfer characteristic of the cathode-ray tube employed at the output. These nonlinear amplifiers require a rather involved aligning procedure as well as constant supervision to make sure that age, power supply variations, etc., do not cause these amplifiers to drift out of alignment.

An object of this invention is to reduce the requirement for more than one nonlinear amplifier in a channel of the printer-timer system of the type described.

Another object of the present invention is to simplify the apparatus required for a printing timer of the type described.

Still another object of the present invention is to reduce the alignment time required for a printing timer of the type described.

Yet another object of the present invention is to make more reliable and inexpensive printing timers.

These and other objects of the invention are achieved by providing an improved printing timer wherein a channel is associated with each group of different color image-aspect signals similar to the printing timer described in the above-noted application. In each of the channels, however, a single nonlinear amplifier is employed which is adjusted to perform the functions of both the logarithmic amplifier and the photocurve amplifier. This requires an alteration in the operation and location of the printing-light control and indicator in the circuits. In the previous embodiment of the invention, the printer-light indicator followed the first nonlinear amplifier and was a variable pedestal-clipping circuit. In this invention, the printer light apparatus is replaced by a simple attenuator which is positioned in front of the nonlinear amplifier.

The nonlinear amplifier in each channel is followed, where required, by the network between channels, which cross-feeds signals to simulate the effects of dye overlap in the positive reproducing medium. In each channel there then follows a linear amplifier having a gain control. This gain control, in effect, is a contrast control, and an indicator which is variable therewith indicates the contrast. The output of the linear amplifier is then followed by the cathode-ray tube, which either has a screen with a phosphor color corresponding to that associated with the channel or has a white phosphor and a filter positioned in front of the tube which has a color associated with the channel color.

The outputs of the cathode-ray tubes are superimposed to present a composite picture in color responsive to the separate color negative signals applied to the input. Calibrations on indicators associated with the printer-light attenuator and on the indicator associated with the linear amplifier gain control provide data as to the required printer-light units and contrast associated with the color picture presented by the cathode-ray tube apparatus. This enables the developing processes to be carried out to provide a positive picture having brightness and contrast qualities suitably identical with those of the picture presented.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
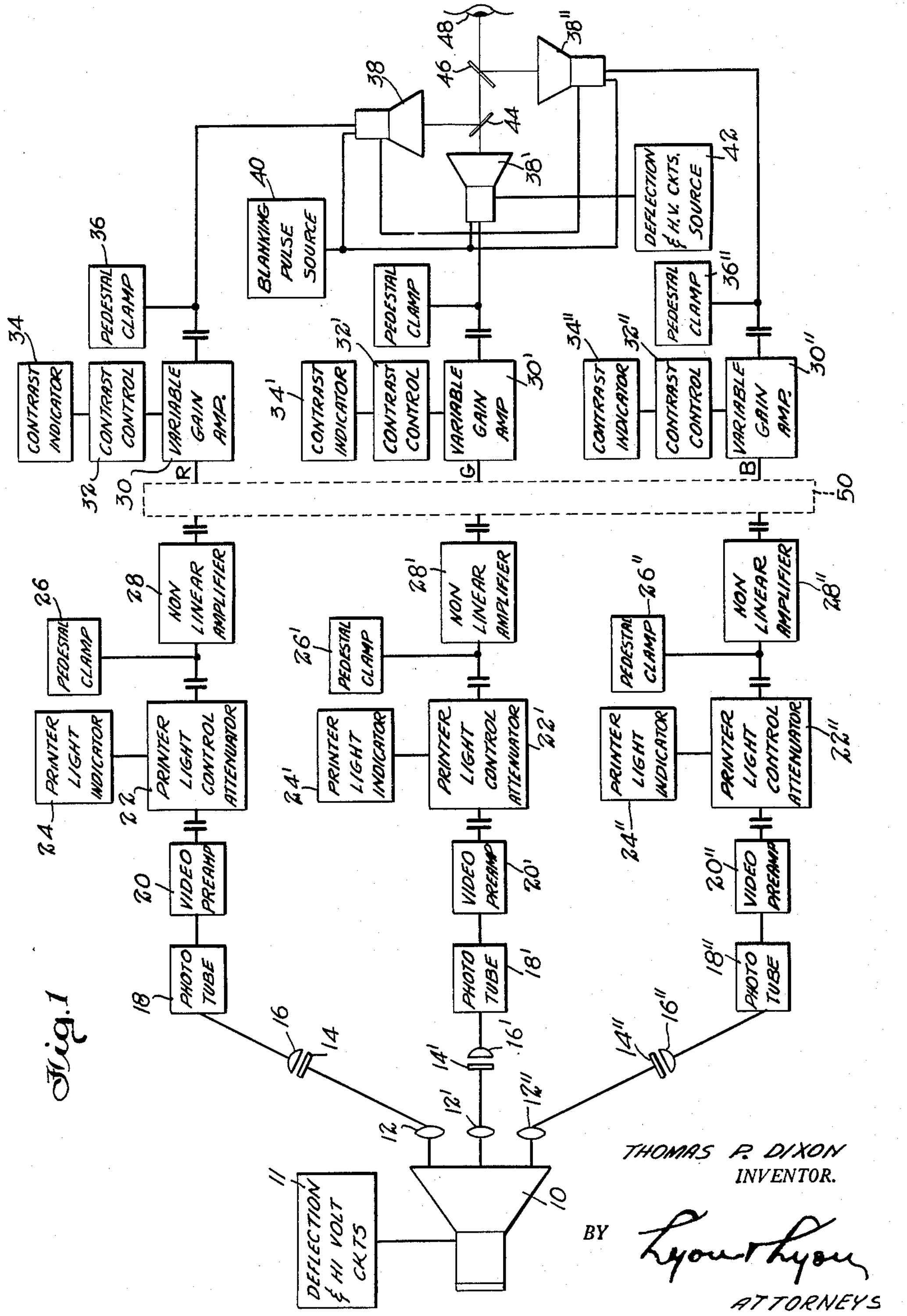
Figure 1 is a block diagram of an embodiment of the invention.

Referring now to Figure 1 of the drawing, a block diagram of the improved printing timer includes a flying-spot-scanner tube 10, which is used to provide a scanning-light beam. This beam is split into 3 by 3 objective lenses 12, 12′, 12″. The three beams are directed onto corresponding areas of three color-image-aspect negatives 14, 14′, 14″. These respectively represent red, green, and blue colors. The three scanning beams of light scan the three negatives in such manner that the discrete areas covered by each beam at any one time on each negative corresponds to that on the other negatives. The output from each negative is collected by means of a lens and directed to fall upon a separate phototube 18, 18′, 18″. Each phototube generates a signal whose amplitude is representative of the transmission of the light beam through the negative at the discrete area upon which the light impinges.

It should be here noted that the three electrical signals which are provided by the phototube are representative of the light transmission through a color image-aspect negative. One manner of generating these signals is illustrated in the drawing. In place of three color image-aspect negatives, a single tripack negative could be employed. Light transmitted through it could be split into three beams in well-known manner employing dichroic mirrors to provide three signals which also can be considered as signals representative of the image aspect recorded on a color negative. The showing of the manner of generating these signals is not to be taken as a limitation upon the invention. The fact to be considered is that the signal to be presented to the apparatus following the phototubes is that representative of the signals obtained by transmitting light through a color image-aspect negative.

The output of each phototube is applied to a video preamplifier 20, 20′, 20″. The flying-spot-scanner tube, phototube pickup, and video preamplifier of a suitable type are well known in the television field and may be found described, for example, in Television Engineering, pp. 91 et seq., by Fink, which book is published by the McGraw-Hill Book Company. These are referred to as a flying-spot camera. The scanner tube may have its beam deflected in accordance with the United States commercial television standards, namely, 525 lines in 60 fields of 30 frames per second, although these scanning ratios are by no means critical. Since the flying-spot scanner is being deflected in accordance with the standard television practice, the signal obtained at the output of each video preamplifier will be, for each line, a video signal accompanied by a pedestal signal. The pedestal signal occurs during the retrace interval required between the time the beam of the scanner tube reaches the end of one line and is turned over until it is positioned at the beginning of the next line.

The output of the video preamplifier is next applied to the printer-light control 22, 22′, 22″. In this embodiment, the printer-light control consists of a variable attenuator. This may be a potentiometer, preferably having a logarithmic taper. The reason for this is to prevent crowding at one end of the range of the attenuator. Coupled to the printer-light control is a printer-light indicator 24, 24′, 24″. The printer-light control serves to establish the brightness range for the picture which is finally observed on the cathode-ray tube apparatus in the same manner, as increasing or decreasing the brightness of the illumination level of a light source used to print a positive from a negative has the same effect on the positive print. The printer-light-control attenuator may have an indicator coupled thereto to be variable therewith, which is calibrated in units corresponding to the level of illumination required of a printing light to achieve the brightness quality in a positive which is demonstrated by the cathode-ray tube apparatus.

Since printing from a light source may be handled either by fixing the printing time and varying the illumination level or by fixing the illumination level and varying the printing time, the printer-light indicator may also be calibrated in "on" time required employing a fixed-illumination-level source. The output of the printer-light control consists of a video signal. This video signal then has its pedestal clamped to ground by a pedestal clamp 26, 26′, 26″. The output of the pedestal clamp is then applied to a nonlinear amplifier 28, 28′, 28″.

Figure 3:
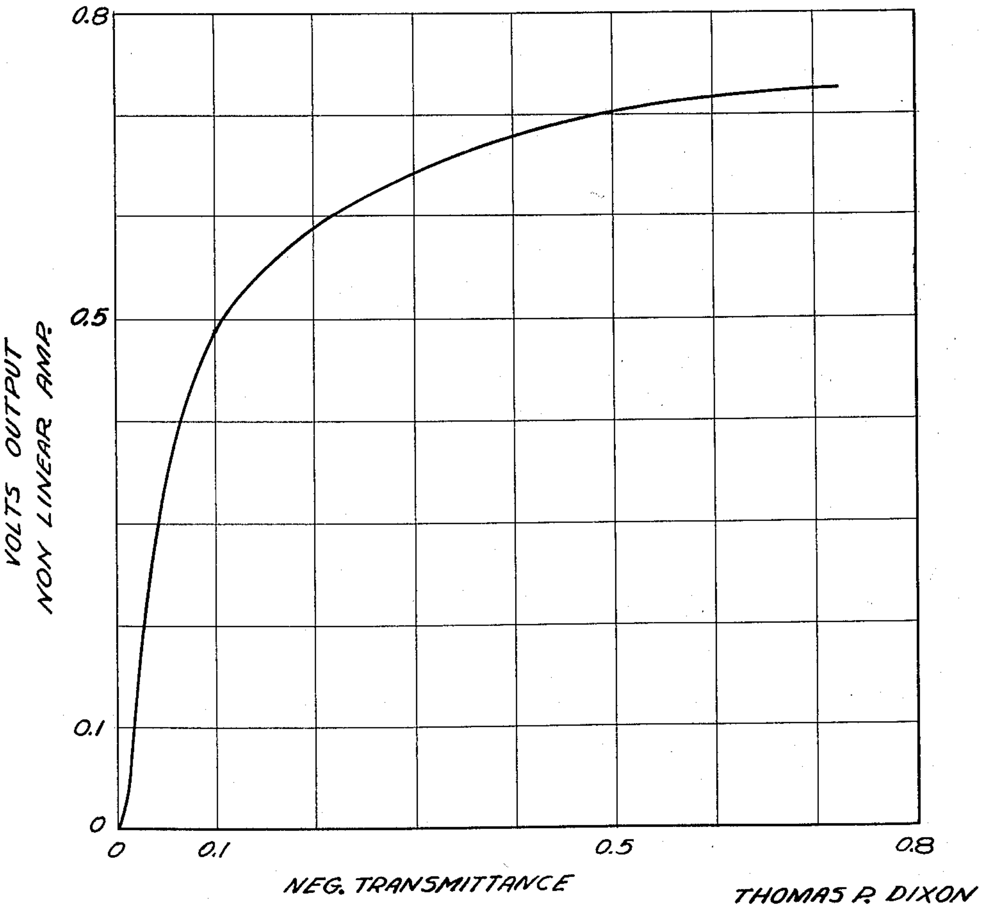
Figure 3 is a curve of the transfer characteristic of the nonlinear amplifier which is employed in each channel.

In the previous embodiment of the invention, two nonlinear amplifiers were employed in each channel. One performed the function of taking the logarithm of its input, thus converting the signal representative of a light transmission through a negative to a signal representative of the density of the negative. The second nonlinear amplifier, which was designated as a photocurve amplifier, served the function of both compensating for the nonlinear transfer characteristic of a cathode-ray tube to which its output was supplied and, also, providing a desired relationship between the negative density and the brightness of the screen of the cathode-ray tube to which it was connected. Both the logarithmic amplifier and the photocurve amplifier were similarly constructed. In the present embodiment of the invention, the single nonlinear amplifier 28, 28′, 28″ in each channel may have the identical structure as the nonlinear amplifier used as the logarithmic amplifier in the previous printing timer apparatus. This nonlinear amplifier is described and shown in detail in the previous application, now Patent No. 2,863,938, and consists of a chain of amplifier stages coupled by diodes which were biased differently to provide desired transfer characteristics. Considering the transfer-characteristic curves of the logarithmic amplifier and the photocurve amplifier, it was found that these could be combined to provide a single curve of the requisite transfer characteristic. This is shown in Figure 3 of the drawings. This single transfer characteristic can be readily simulated or "fitted" by one nonlinear amplifier and, accordingly, the single nonlinear amplifier replaced both photocurve and logarithmic amplifiers. Not only is the amount of apparatus required reduced, but, also, the required alignment time is cut in half.

Since reducing the number of vacuum tubes in a system automatically reduces the number of factors which affect the reliability of the system, the change from two to one nonlinear amplifier increases the reliability of the printing timer considerably. Another incidental saving is provided by this reduction. Previously, two linear amplifiers were required—one following the logarithmic amplifier and the other following the photocurve amplifier. In this invention, by reason of the operation of the photocurve and logarithmic functions being combined, a single variable-gain linear amplifier 30, 30′, 30″ may be employed to replace the two amplifiers previously used. This single linear amplifier has a gain control which may also be designated as a contrast control 32, 32′, 32″. Its operation is similar to the operation of the contrast control in the preceding printing timer. It determines the range of amplification of signals applied thereto and thereby the brightness range for each set of signals being applied to the cathode-ray tube apparatus. A contrast indicator 34, 34′, 34″ is coupled to the contrast control to be variable therewith and to indicate the contrast of the picture being presented.

The output of the variable-gain linear amplifier, after being clamped again by a second pedestal clamp, 36, 36′, 36″, is applied to the control grid of a cathode-ray tube 38, 38′, 38″. The cathode-ray tube is biased so that the more negative the signal the darker the picture. Maximum light output is obtained at substantially zero input signal. As previously explained, each tube has a screen phosphor with a color the same as that of the associated channel. If preferred, this may alternatively be a white phosphor with a filter positioned in front of the screen which has the color associated with the channel. Each cathode-ray tube is driven from a single blanking-pulse source 40 which blanks the tube screen during the same time that the retrace interval occurs at the flying-spot scanner. The three cathode-ray tubes may be driven from a single deflection and high-voltage circuit source 42. Two mirrors 44, 46 are positioned at 45° angles with respect to the tube opposite which they are placed and, also, to permit the light from the two tubes to reach the eye 48 of an observer at the same time and in the same position as the light from the third tube which is being directly observed through the two mirrors.

The reason for the relocation of the printer-light control is that this control must be on the input side of the analog unit which simulates the action of the photographic processes. To further clarify this, consider the photographic operation of printing. With a given negative which has a given density range from highlights to shadow, the positive print may be varied by changing the intensity of the printing light which is equivalent to sliding the negative density range along the abscissa of the H and D curve of the emulsion being used. This is an operation on the input side of the photographic process. In like manner, the electrical analog of the printer light is placed on the input side of the nonlinear amplifier which simulates the H and D function. Heretofore, this H and D function was simulated by the photocurve amplifier. In the present invention, the single nonlinear amplifier simulates this function as well as the others, and, therefore, the printing-light control is located in front of the nonlinear amplifier.

As in the previous printing timer, it is oftentimes desirable to simulate the degrading effects of the dye overlaps which are obtained in the dyes used either in making the final print or the effects of which are desired to be achieved when it is wished to simulate with the printing timer the effects of a positive print being compared with the picture presented by the printing timer.

Figure 2:
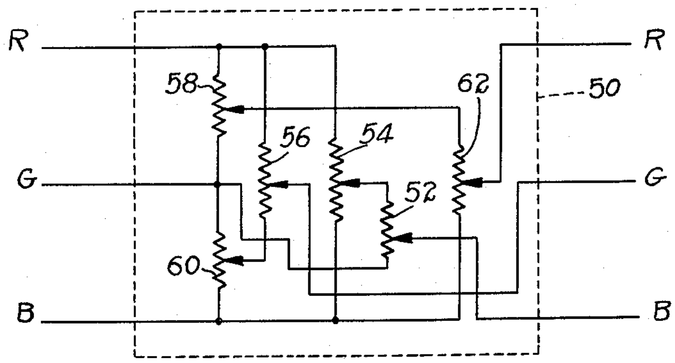
Figure 2 is a schematic diagram of a dye color-degradation-simulation network.

A network 50, enclosed in the dotted lines and shown in detail in Figure 2, may be inserted when required between the nonlinear amplifier and the variable-gain amplifier. To compensate for the degradation in purity or the overlap effect, which causes darkening of the dyes within each other's wavelength region, potentiometric connections are made between the various signals in the manner shown in the drawing. These interconnections permit feeding controlled amounts of signal from one channel to each of the others. It will be recalled that each channel derives its original signal modulation from a photographic negative. That is to say, where the negative has low density, the corresponding signal is large and this must drive the cathode-ray tube dark in order to correctly produce a positive picture. Accordingly, increasing a signal by adding thereto goes in the direction of darkness, and the cross-channel exchange of signals works in the desired direction to simulate dye overlaps in the subtractive print. A detailed description of the operation of this network is found in the previously referred to application for printing timer. However, if it is assumed that the first channel is associated with the color red, the second channel with the color green, and the third channel with the color blue, then the cross-feeds from one channel to the other control the simulation of the absorption effects as follows: potentiometer 52—blue absorption by magenta dye; potentiometer 54—blue absorption by cyan dye; potentiometer 56—green absorption by cyan dye; potentiometer 58—red absorption by magenta dye; potentiometer 60—green absorption by yellow dye; and potentiometer 62—red absorption by yellow dye.

In order to operate the improved printing timer, the single nonlinear amplifier has its transfer characteristic aligned in accordance with the curve shown in Figure 2. As previously indicated, this curve is a combination of the logarithm, cathode-ray tube transfer characteristics, and desired relationship between negative density and cathode-ray tube brightness characteristics. The masking network 50, if it is to be used, is adjusted to provide the proper cross-feed of voltages in accordance with the information derived from the wavelengths of the dyes which are to be used in the final, positive print. The three image-aspect negatives are positioned to be simultaneously scanned by the three beams of light provided from the flying-spot scanner. The color picture seen by the observer may then have its brightness for each color, and, thereby, over-all brightness, adjusted to a desired level by varying the printer-light control attenuator. The contrast of the picture being viewed can also be varied by varying the gain of the variable-gain amplifier. When the picture presented has the desired quality, the contrast and printer-light indicators may be read, and this information can subsequently be employed in the printing of the positive. Should it be desired to use a single cathode-ray tube and a color filter wheel in front of it, the outputs from the masking network 50 may be sequentially gated into a single variable-gain amplifier whose output is applied to a single cathode-ray tube having a white phosphor screen. A color wheel having the three filters corresponding in color to the colors represented by the inputs to the three channels is rotated to present the three filters synchronously with the sequential gating operation.

It will be appreciated that by combining the functions of the nonlinear amplifiers the structure of the printing timer is considerably simplified in cost and maintenance. A new and novel arrangement is presented whereby there may be reproduced electronically in color positive pictures from signals corresponding to the light transmission of color image-aspect negatives. Thereby, accurate and reliable information for the timing and chemical processing of color pictures, both for still and motion picture photography, for achieving a result which is seen in advance may be obtained.

I claim:

1. Apparatus for obtaining parameters for making a positive print of a colored object by presenting a positive color picture of said object with cathode-ray tube apparatus from electrical signals representative of point-by-point light transmission of color image-aspect negatives of said object, said apparatus comprising a separate channel for each color to which said signals associated with that color are applied, each channel including a variable attenuator, a single means to modify the output from said attenuator to be representative of a desired relationship between negative density and screen brightness of said cathode-ray tube apparatus, a variable-gain control means to which output from said single means is applied, and means to apply the output of each of said variable-gain control means to said cathode-ray tube apparatus to present a positive color picture of said colored object.

2. Apparatus as recited in claim 1 wherein said variable attenuator has an indicator coupled to be variable therewith said indicator being calibrated in terms of printer-light illuminator units required to obtain a positive print having the same brightness, and said gain-control means has an indicator coupled to be variable therewith, said indicator being calibrated in terms of the contrast required of the materials used for printing the picture of said colored object to provide a positive print having the same brightness.

3. Apparatus for presenting a positive color picture as recited in claim 1 wherein said single means includes a nonlinear amplifier whose transfer characteristics are adjusted to be the combination of a logarithmic transfer characteristic and a transfer characteristic in accordance with a predetermined relationship between the signal input to said amplifier and a desired brightness of said cathode-ray tube screen.

4. In a printing timer apparatus of the type wherein electrical signals representative of point-by-point light transmission of color image-aspect negatives of said object are applied to associated color channels and a positive picture in color is displayed by cathode-ray tube apparatus at the outputs of said color channels, the improvement in each channel consisting of a variable attenuator, an indicator coupled to said variable attenuator to be variable therewith said indicator being calibrated in printer-light control units, a nonlinear amplifier coupled to said variable attenuator, said nonlinear amplifier having a transfer characteristic in accordance with a predetermined relationship between the input signal to said amplifier and a desired brightness of said cathode-ray tube screen to represent a desired relationship between image-aspect negative density and cathode-ray tube screen brightness, a linear amplifier having a variable-gain control, and an indicator coupled to be variable therewith, said indicator being calibrated in terms of the contrast required of the materials used for printing the picture of said colored object to provide a positive print having the same color brightness.

5. A system for obtaining printing parameters by presenting electronically a positive color picture of an object with cathode-ray tube apparatus from signals representative of the light transmission of discrete areas of color image-aspect negatives comprising a separate channel for the signals from each color image-aspect negative, each of said channels including a variable attenuator, an indicator calibrated in terms of printer-light illumination units coupled to said attenuator to be variable therewith, a nonlinear amplifier coupled to said attenuator and having a transfer characteristic in accordance with a predetermined relationship between the input signal to said amplifier and a desired brightness of said cathode-ray tube screen to represent a desired relationship between image-aspect negative density and cathode-ray tube screen brightness, network means coupled between said channels at the output of said non linear amplifier in each channel to feed signals therebetween representative of the overlap effects of primary color dyes to be used for subtractive representation of said color picture, a linear amplifier in each channel having a variable-gain control, an indicator calibrated in units of contrast for each variable-gain control coupled thereto to be variable therewith, and means to apply the outputs of said channels to said cathode-ray tube apparatus.

6. Apparatus for presenting a positive color picture of a colored object from electrical signals representative of point-by-point light transmission of color image-aspect negatives of said object comprising a separate channel for each color to which signals associated with that color are applied, each channel including a variable attenuator, a nonlinear amplifier connected to receive output from said variable attenuator, a variable-gain control coupled to the output of said nonlinear amplifier, and a cathode-ray tube coupled to the output of said variable-gain control, said nonlinear amplifier having a transfer characteristic representative of a desired relationship between its signal input and a desired brightness of said cathode-ray tube screen, and means to superimpose the outputs of the cathode-ray tubes for each channel to present a positive color picture of said colored object.

7. In a printing timer apparatus of the type wherein electrical signals representative of point-by-point light transmission of color image-aspect negatives of said object are applied to associated color channels and a positive picture in color is displayed by cathode-ray tube apparatus at the outputs of said color channels, the improvement in each channel consisting of a variable attenuator, an indicator coupled to said variable attenuator to be variable therewith said indicator being calibrated in printer-light control units, and a nonlinear amplifier coupled to said variable attenuator, said nonlinear amplifier having a transfer characteristic in accordance with a predetermined relationship between the input signal to said amplifier and a desired brightness of said cathode-ray tube screen to represent a desired relationship between image-aspect negative density and cathode-ray tube screen brightness.

References Cited in the file of this patent

UNITED STATES PATENTS

| | | |
|---|---|---|
| 2,083,374 | Harley | June 8, 1937 |
| 2,286,730 | Hall | June 16, 1942 |
| 2,309,048 | Curry | Jan. 19, 1943 |
| 2,607,845 | Clark | Aug. 19, 1952 |
| 2,691,696 | Yule | Oct. 12, 1954 |
| 2,710,889 | Tobias | June 14, 1955 |
| 2,721,892 | Yule | Oct. 25, 1955 |
| 2,757,571 | Loughren | Aug. 7, 1956 |
| 2,863,938 | Evans et al. | Dec. 9, 1958 |